United States Patent [19]
Judlowe

[11] 3,711,775
[45] Jan. 16, 1973

[54] SIGNAL TRANSLATING CIRCUIT FOR PASSING VERY LOW FREQUENCY INFORMATION

[76] Inventor: Stephen B. Judlowe, 47 Sagamore Drive, Murray Hill, N.J. 07971

[22] Filed: Dec. 8, 1969

[21] Appl. No.: 882,910

[52] U.S. Cl. .............................. 324/123 R, 324/113
[51] Int. Cl. .......................... G01r 1/30, G01r 13/04
[58] Field of Search .324/123 R, 123 C, 113; 330/28, 330/30, 30 D, 69; 307/229; 346/34, 62; 328/165, 167, 150, 151

[56] References Cited

UNITED STATES PATENTS

| | | | |
|---|---|---|---|
| 2,125,345 | 8/1938 | Hunt | 346/34 X |
| 3,321,767 | 5/1967 | Fulchino | 346/62 X |
| 3,447,095 | 5/1969 | McMillan | 330/69 X |
| 3,516,006 | 6/1970 | Donjon | 330/69 |
| 3,390,329 | 6/1968 | Gewirtz | 324/123 X |
| 3,529,252 | 9/1970 | Long | 330/28 X |

OTHER PUBLICATIONS

Moschytz et al.; Active Filters: part 5 ...; Electronics; Dec. 9, 1968; pg. 98–106.
Salerno; Active Filters: part 7 ....; Electronics; Feb. 17, 1969; pg. 100–105.
Weed et al.; Fundamentals of Electron ...; Prentice-Hall, Inc.; 1959; pg. 1, 494–509.
Grabbe et al.; Handbook of Automation ...; Part 3; John Wiley & Sons, Inc.; 1961; pg. 1, 14-08 to 14-13.

*Primary Examiner*—Rudolph V. Rolinec
*Assistant Examiner*—Ernest F. Karlsen

[57] ABSTRACT

Circuitry for passing the very low frequency information content of an infrequently sampled analog signal while rejecting concomitant noise and spurious transient voltages includes a difference amplifier having a feedback resistor-capacitor and input signal coupling and scaling circuitry for providing a very slow and stable characteristic response to an input analog signal.

When employed in conjunction with a plural transducer channel, sampled data system, the circuitry avoids data scattering which otherwise obtains.

8 Claims, 1 Drawing Figure

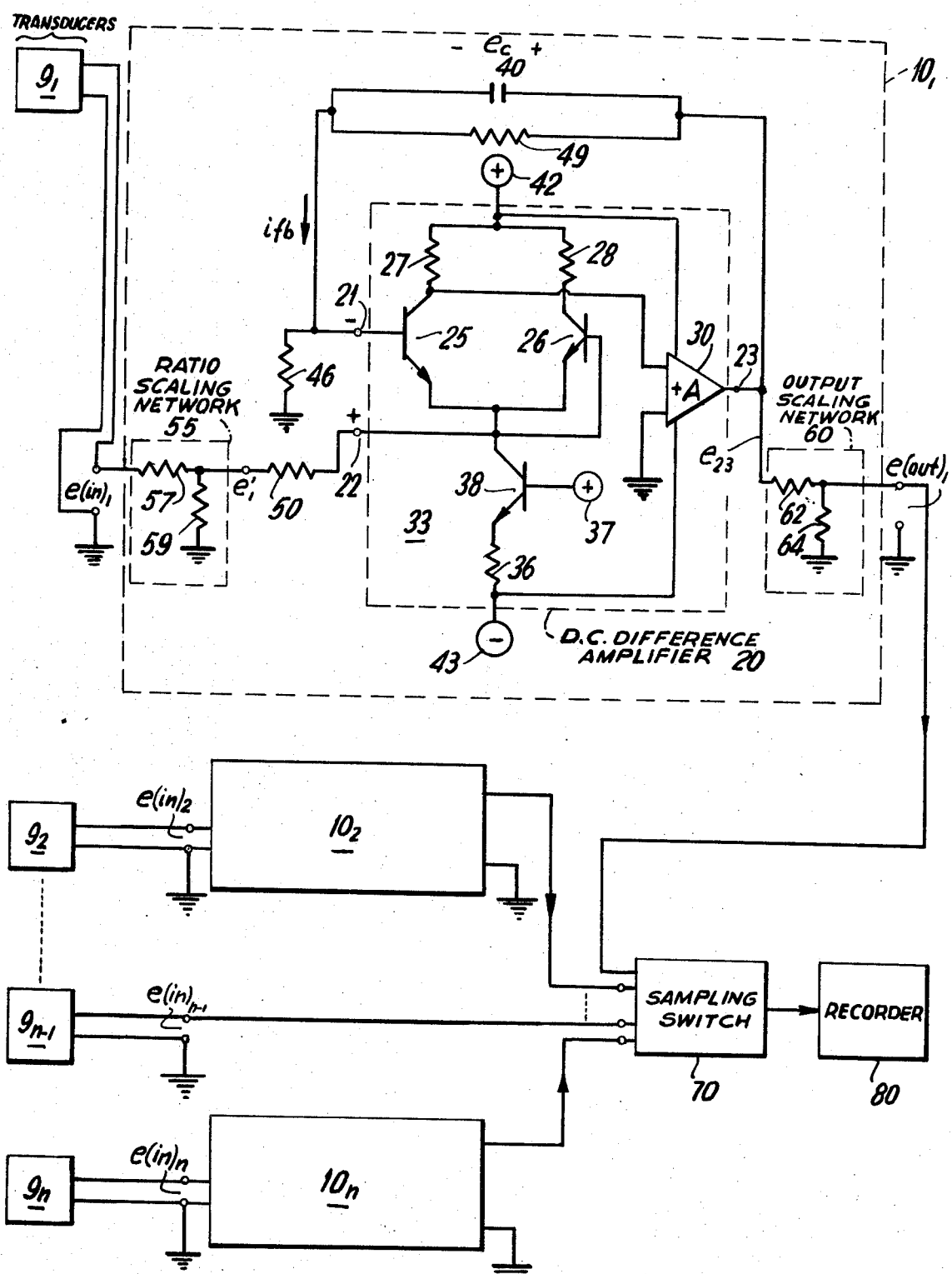

SIGNAL TRANSLATING CIRCUIT FOR PASSING VERY LOW FREQUENCY INFORMATION

This invention relates to electronic measurements and, more specifically, to apparatus for eliminating spurious contributions to the information value of low frequency electronic analog signals.

In many applications of present commercial and industrial interest, plural transducers are employed to generate a like plurality of electrical analog signals each representative of the value of a particular parameter of interest in a subject application, e.g., a ship, airplane, controlled environment, manufacturing process, or the like. For example, for a ship, many transducers of a rather straightforward construction are typically employed to measure various pressures and temperatures associated with the ship's propulsion plant; and other, often highly complex transducers are utilized to supply an analog representation of speed, horsepower, and various fluid flows among many others.

For many applications, a permanent record is made of each transducer output. To avoid generating an unwieldy plethora of records, the transducers are sampled at periodic intervals to compress data gathered over a relatively extended time span (e.g., a day) onto a single record document. Where a tanker vessel will sail many days on a voyage, its data (which will be almost constant for the most part) may illustratively be sampled at five or fifteen minute intervals.

However, the analog output of a transducer is subject to high and low frequency perturbations. For severe electronic noise situations, the output signal amplitude will only rarely be at or near the correct level as a transition point between markedly excessive and undervalued levels. The source of these error signals may be common electrical noise as produced, for example, by induction via the energy radiated by motors and/or heavy current-carrying busses; or common mode or noisy ground signals, the recorder being located many hundreds of feet from some of the transducers. Further, the measured quantity may inherently give rise to a fluctuating signal, e.g., where a turbulent feed water flow passes a flow meter.

Accordingly, when a transducer output is sampled only infrequently or once every several minutes, its then instantaneous output value may depart radically from a true indication of the physical parameter being measured.

It is thus an object of the present invention to provide an improved signal translating apparatus.

More specifically, an object of the present invention is the provision of electronic circuitry for extracting the very low frequency information content of a signal, while effectively rejecting spurious concomitant noise signals.

These and other objects of the present invention are realized in a specific, illustrative signal processing organization for extracting meaningful, consistent very low frequency data from relatively infrequently sampled transducers. The organization includes a difference amplifier having a parallel resistor-capacitor feedback network between the output and inverting input terminals thereof, and a resistor is connected between the inverting input terminal and common ground.

The input signal is reduced in magnitude by an input scaling network to the millivolt range, and applied to the noninverting input terminal of the difference amplifier. The feedback elements, operating in conjunction with the small input signal voltage and the impedance to ground at the inverting amplifier input terminal, constrain the feedback amplifier to consume several minutes to respond to an applied input signal.

Accordingly, the arrangement settles to an output signal equal to, or proportional to the very low frequency, or direct current content of the input signal. Correspondingly, the alternating current noise content of the applied signal is rejected, and has at most only a de minimus effect on the output potential — and this even if the noise is the same size as, or larger than the information potential.

The above and other objects, features and advantages of the present invention are realized in a specific, illustrative signal translating circuit, described hereinbelow in conjunction with the accompanying drawing thereof.

Referring now to the drawing, there is shown a sampled data system including a plurality of signal sources $e(in)_1, e(in)_2 \ldots e(in)_n$ which may illustratively comprise the outputs from a corresponding plurality of transducers $9_1-9_n$ which measure various parameters of interest in a process, ship, plane, or other environment or application. As discussed hereinbelow, the input signals may comprise current signals as well.

The signals $e(in)_i$ are supplied to a data sampling switch 70 either directly (e.g., the signal $e(in)_{n-1}$), or via a very low frequency information extracting, noise rejecting circuit $10_i$ described below. The sampling switch 70 sequentially connects the $n$ signals being monitored to the input of a recorder 80. The sampling rate may be rapid, or each of the various parameter measuring signals may be sampled only infrequently — for example once every several minutes — as where the performance of a ship is to be continuously monitored over a period of weeks, months or years. The sampler 70 may comprise any commutating switch well known to those skilled in the art, including electronic and mechanical switching assemblies, including, for example, transistor switches, FET switches, a stepping switch, sequentially enabled read relays or the like. The recorder 80 may comprise a multipoint digital printer; a discretely enabled multipoint strip chart recorder; or the sampler 70 and the recorder 80 may both comprise the graphical X-Y multipoint recorder sold by Marine Measurements, Inc. of Berkley Heights, New Jersey.

Signals may be directly connected to the sampler 70, as the signal $e(in)_{n-1}$ where the transducer output is stable (e.g., a temperature measurement where a large heat mass provides inertia for the output signal), and where the transducer is located relatively close to the sampler 70 such that ground loops and signal induction problems are within tolerable limits. Conversely, where the transducer output per se is inherently noisy, e.g., for a flow measurement where the flow is turbulent, or where noise problems are considerable, e.g., where noisy grounds, long lead lengths, or large induction signals are encountered, the circuit $10_i$ is employed.

Examining now the very low frequency information extracting circuit $10_1$ associated with the transducer $9_1$, this circuit being illustrative of the other corresponding organizations $10_i$, the output $e(in)_1$ from the transducer $9_1$ is supplied to a rate scaling network 55 comprising voltage divider resistors 57 and 59. The input scaling network 55 reduces the output of the transducer $9_1$, which may vary full scale anywhere up to the many volt range, down to the order of low millivolts, the instantaneous output of the network 55 being noted as $e_1'$. The voltage $e_1'$ is coupled by a resistor 50 (employed to equalize the voltage produced by amplifier bias currents) to a non-inverting input terminal 22 of a high gain, D.C. difference amplifier 20. In its overall effect, the difference amplifier 20 includes noninverting and inverting input terminals 22 and 21, and an output terminal 23, the well known properties of the amplifier being such that positive signals impressed at the input terminals 22 and 21 respectively give rise to positive and negative output voltage swings at the amplifier output terminal 23 (and negative input signals produce output voltage swings opposite to those stated above). Further, the gain of the difference amplifier is made large such that small differential input voltage signals give rise to large output voltage signals.

Specific embodiments of the direct current difference amplifier 20 are well known to those skilled in the art. For purposes of illustration, the difference amplifier 20 shown in the drawing includes two transistors 25 and 26 having their emitters interconnected and connected to a negative voltage supply 43 by a constant current source comprising a transistor 35 with an emitter resistor 36. The base of the transistor 35 is connected to a potential source 37. The constant current divided between the two difference measuring transistors 25 and 26 is essentially given by the ratio of the voltage of the source 37 ($V_{37}$) to the resistance of the element 36 ($R_{36}$). As used herein, the value of any component, e.g., $R_{xy}$, $C_{mn}$, $V_{pq}$, refers to the value of the component identified in subscripts, i.e., resistor xy having a value of R ohms; capacitor mn having a capacity of C farads and voltage source pq having a voltage of V volts. The voltage source 37 may comprise a voltage divider connected between sources 42 and 43 or, preferably, a zener diode regulated voltage.

The difference measuring transistors 25 and 26 respectively include collector resistors 27 and 28 which are returned to the positive voltage source 42. The voltage developed across the collector load resistor 27 is supplied to a follower amplifier 30 having a voltage gain of A, the output of the amplifier 30 comprising the output of the composite D.C. difference amplifier 20.

To illustrate the operation of the difference amplifier 20, a small positive input signal applied at the noninverting amplifier input terminal 22 increases connection through the transistor 26 such that more of the constant current $V_{37}/R_{36}$ flows through the load 28 than through the resistor 27. Accordingly, the input to amplifier 30 developed across the load resistor 27 becomes more positive as does its output by the amplification factor A. Thus, the output of the amplifier 30 (and thereby also the output of the composite amplifier 20) is a large positive replica of the applied input signal. Corresponding analyses reveal that a positive test signal at the inverting amplifier input terminal 21 gives rise to a large corresponding negative output at the amplifier output terminal 23; and that negative inputs to the noninverting and inverting terminals 20 and 21 give rise to negative and positive output voltages at the amplifier output 23.

A shunt feedback network comprising a capacitor 40 and a resistor 49 connects the amplifier output terminal 23 with the inverting input terminal 21, and a resistor 26 connects the inverting input terminal 21 to common ground. Finally, an output scaling network 60 comprising voltage divider resistors 62 and 64 is employed to reduce the output of amplifier 20 to the desired signal range.

To illustrate the very low frequency information passing, noise rejecting properties of the signal processing circuitry $10_1$, the response of the circuit to a step function input voltage will now be considered. Assume that the transducer $9_1$ supplies an output signal in the range of 0 to 0.5 volts (500 millivolts) and that the signal $e(\text{out})_1$ from the output scaling network 60 should similarly range from 0 to 500 millivolts. This matching of signals is preferable, for example, where the input of recorder 80 associated with the channel 1 has signal range accommodating components designed for the output of the transducer $9_1$. The full scale 0–500 millivolts range for the transducer $9_1$ may identify a full monitored range for a temperature, pressure, flow, or whatever other parameter is being sensed, the electrical output of the measured parameter being defined by the transfer characteristic of the device $9_1$.

A full scale voltage step $\overline{e_1}$ going from 0 to 500 millivolts for $e(\text{in})_1$ gives rise to an output $e_1'$ from the input or rate scaling network 55 of $$e_1' = (R_{59}/R_{57}+R_{59})\,\overline{e_1} \qquad (1)$$

where $\overline{e_1}$ equals 500 millivolts. The signal $e_1'$ is assumed positive, but it makes no difference; an analysis for a negative applied input signal parallel to that given below for the assumed case gives rise to like results.

The positive signal $e_1'$ momentarily unbalances the potentials at the amplifier input terminals 21 and 22 and, accordingly, the output amplifier voltage rises at a rapid rate of speed (the slew rate of the amplifier which may be very fast). However, the voltage across the capacitor 40 cannot change instantaneously and, accordingly, to a very high degree of approximation (one part in many thousands depending upon the gain of the difference amplifier 20), the output of the amplifier 20 is permitted to rise only $e_1'$ volts. This voltage $e_1'$ is coupled by the capacitor 40 to the inverting input amplifier input terminal 21.

Thus, the capacitor 40 serves to approximately equalize the voltages at the inverting and noninverting amplifier input terminals 21 and 22. If this were not the case, i.e., if there were any permanent significant disparity in the two voltages, the large gain of the difference amplifier would produce a great swing in its output (theoretically — absent supply limitations — hundreds of volts even for a millivolt disparity), and this it cannot do by reason of the capacitor 40 which couples a voltage back to the inverting input terminal in a polarity to overcome any change in the output voltage. Some reflection will show that first the capacitor 40, then the composite feedback network 40–49, and finally the resistor 49 serve throughout all operation of the circuitry 10 to maintain the voltage at the inverting amplifier input terminal 21 at almost precisely that obtaining at the inverting input terminal.

The constant voltage $e_1'$ at the inverting input terminal 21 of the difference amplifier 20, together with the very high input impedance of the difference amplifier, gives rise to a current $i_{fb}$ flowing through the shunt feedback elements 40-49 given by $$i_{fb} = e_1'/R_{46} \qquad (2)$$

Substituting the value for $e_1'$ of equation (1) into equation (2) we have $$i_{fb} = (1/R_{46}) \cdot (R_{59}/R_{57}+R_{59}) \cdot \overline{e_1} \qquad (3)$$

The constant current $i_{fb}$ for the assumed step input initially flows exclusively through the capacitor 40 to initiate charging of the capacitor, thereby permitting the voltage output at the amplifier output terminal 23 to rise. After some voltage is developed across the capacitor, some of the current $i_{fb}$ must, of course, flow through the resistor 49. Employing Thevenin's theorem to the "constant" current $i_{fb}$, capacitor 40 and resistor 49, it may be seen that the voltage $e_c$ across the capacitor 40 in the polarity indicated in the drawing is $$e_c = \frac{\overline{e_1}R_{49}}{R_{46}} \cdot \frac{R_{59}}{R_{57}+R_{59}} \left(1-e-\frac{t}{R_{49}C_{40}}\right). \qquad \text{Equation (4)}$$

The output voltage $e_{23}$ at terminal 23 of the amplifier 20 is given by the voltage across the capacitor 40 plus the voltage across resistor 46. The voltage output $e_{23}$ of the difference amplifier 20 is thus $$e_{23} = \frac{\overline{e_1}R_{49}}{R_{46}} \cdot \frac{R_{59}}{R_{57}+R_{59}} \cdot \left(1-e-\frac{t}{R_{49}C_{40}}\right)+\overline{e_1}. \qquad \text{Equation (5)}$$

However, since $\overline{e_1}$ is on the order of low millivolts, and since the voltage across the voltage capacitor $e_c$ may run several volts, the latter quantity in equation (5) may be ignored and, to a very good approximation the output amplifier voltage is given by $$e_{23} = \frac{e_1 R_{49}}{R_{46}} \cdot \frac{R_{59}}{R_{57}+R_{59}} \left(1-e-\frac{t}{R_{49}C_{40}}\right). \qquad \text{Equation (6)}$$

Finally, the output scaling network 60 reduces the voltage $e_{23}$ to the desired range, which may or may not be the same as the input range. In fact, the network 60 may be deleted entirely where the entire range of several volts for $e_{23}$ is acceptable for the recorder.

However, for the assumed case, $e(\text{out})_1$ must be reduced to the same range (0–500 m.v.) as the output of the transducer $9_1$. This is often the situation since the input circuitry of the recorder 80 may not be able to accept volt range inputs from one or more channels, and millivolt inputs from another channel, e.g., from the directly coupled transducer $9_{n-1}$.

Accordingly, after passing from the output signaling network 60, the output of the circuit $10_1$ becomes $$e(\text{out})_1 = e_1 \frac{R_{49}}{R_{46}} \cdot \frac{R_{59}}{R_{57}+R_{59}} \cdot \frac{R_{64}}{R_{62}+R_{64}} \left(1-e-\frac{t}{R_{49}C_{40}}\right) \qquad \text{Equation (7)}$$

By selecting the value $R_{49}$ greater than the value of $R_{46}$ such that the ratio $R_{49}$ over $R_{46}$ (greater than one) exactly offsets the product of the voltage divisions effected by the scaler networks 55 and 60 (each having a transfer function less than one as is their product), i.e., by choosing resistors such that $$R_{49}/R_{46} = (R_{59}/R_{57}+R_{59}) \cdot (R_{64}/R_{62}+R_{64}) \qquad (8)$$

the output from the output signaling network 60 will be given by $$e(\text{out})_1 \doteq e_1 \left(1-e-\frac{t}{R_{49}C_{40}}\right)$$

Equation (9)

Thus, the output $e(\text{out})_1$ has the same amplitude as the input step function $\overline{e_1}$, but is delayed therefrom.

To illustrate, let $\overline{e_1}$ equal 10 millivolts, $R_{46}$ equal 5,000 ohms, $R_{49}$ equal 800,000 ohms (a ratio $R_{49}/R_{46} = 160$); and capacitor $C_{40}$ equal 500 microfarads. Examining equation (6), and deleting the signal scaling factor for the input rate scaling network 55 which has already been discounted in arriving at the 10 millivolt input $\overline{e_1}$, we find a rate of change for the output voltage for the step input (slewing rate) of $$\frac{d(e_{23})}{dt} = \frac{e_1 e}{R_{46}C_{40}} - \frac{t}{R_{49}C_{40}} \quad \text{Equation (10)}$$

which has a maximum value of $$\left|\frac{d(e_{23})}{dt}\right| \max_{t=0} = \frac{\overline{e_1}}{R_{46}C_{40}} \quad \text{Equation (11)}$$

which can be made as small as desired by reducing $\overline{e_1}$, or increasing either $R_{46}$ or $C_{40}$. For the specific values chose, the maximum rate of change for the output voltage will be 0.004 volts per second or 0.24 volts per minute. Thus, since the circuit has a full scale range of 10 millivolts times 160 or 1.6 volts, full signal would not be reached at the maximum linear rate (not the actual case) for several minutes, and actually takes an appreciable longer time for the actual exponential charging rate. In actual operation, the noise rejecting circuitry $10_1$ takes several minutes to fully respond to any step function input and attain an output voltage equal (or proportional) to the output of the transistor $9_1$.

This output voltage is either the same as that of the output of the transistor $9_1$, or proportional to the output of the transistor $9_1$, where there is no requirement that $e(\text{out})_1$ equal $e(\text{in})_1$ (peak amplitudes), e.g., where the output $e_{23}$ is acceptable for recorder use. This output voltage $e(\text{out})_1$ is very stable since it takes a very long time for the signal translating apparatus $10_1$ to respond to any change in the input signal. It takes minutes for the circuit to respond to a step change in the applied signal $e(\text{in})_1$ and it takes considerably longer for the circuit to respond to any other input time function.

In actual practice, for measurements taken over the many days of use, a constant or very slowly varying information signal is applied at the input of the network $10_1$, and the network has long since fully responded to this signal, i.e., $e(\text{out})_1 = e(\text{in})_1$ (quasi D.C. component). That the information signal content changes very slowly at most for many ship's applications can be illustratively seen considering a speed signal for a supertanker which takes nine full miles to come to rest; or viewing the great thermal inertia of a massive boiler for a temperature measurement.

Superimposed on the very low frequency or D.C. information signal is noise, almost invariably alternating current perturbations, which vary in frequency from relatively high frequency electronic radiation to 60 c.p.s. power frequency (and possibly lower due to propeller or other machanically induced noise). Each positive noise voltage excursion tends to raise the output $e(out)_1$, and each negative excursion tends to reduce the output by an equal amount thus producing no net change per noise cycle. Because the signal translating network responds so slowly to the input, the positive and negative variations in the output are negligible. For example, if a full scale (10 m.v.) 60 c.p.s. square wave were superimposed on the full scale 10 m.v. input treated in the above example, the error in the output $e_{23}$ is less than 1 microvolt (compared with 1.6 signal volts), or less than one ten thousandth of one per cent. Thus, the circuitry of the drawing converts an extreme and intolerable input noise voltage situation into one where the output noise is essentially unmeasurable.

In total effect then, the apparatus $10_1$ provides a consistent and constant output signal $e(out)_1$ which is not subject to noise or other spurious perturbations. Thus, when the output of channel 1 is sampled, the sampling network 70 supplies consistent readings which are not subject to mere chance as to when the sampling occurred, i.e., the recorded output of channel 1 for a constant or slowly varying input is stable, comparable data, and does not provide a broad discrete scatter range of values which depend upon the specific moments when the sampling occurred.

Moreover, the output impedance of the composite D.C. difference amplifier 20 is very low because of the feedback action. Thus, relatively low impedance output loads may be driven directly, or via a low impedance output scaling network 60, without introducing signal error, or quickening the circuit response to input error transients.

Thus, the composite apparatus shown in the drawing is operable to provide a stable set of values for a plurality of measured parameters. These values embody consistent data for display by the recorder 80. Hence, worthwhile data is developed to reflect the performance of the monitored plane, process, environment or the like.

It is to be understood that the above-described circuitry and apparatus are merely illustrative of the application of the principles of the present invention. Numerous modifications and adaptations thereof will be readily apparent to those skilled in the art without departing from the spirit and scope of the present invention. For example, a transducer supplying a current range output may be employed, the rate signaling network 55 simply being replaced by a simple resistor to ground to effect a current-to-voltage conversion. The value of the resistor is chosen such that the full scale current gives rise to the full millivolt value applied voltage signal.

Also, where an inverted output signal $e(out)_1$ is tolerable or preferred, the noninverting amplifier input 22 may be connected to ground, as by the offset equalizing 50, and the resistor 46 employed to connect the inverting input terminal 21 to the output of rate scaling network 55. Further, the input scaling network 55 may be deleted where the corresponding transducer output is per se adapted to provide a maximum output signal within the desired millivolt range. Moreover, for the inventing mode, $i_{fb}$ is in essence determined by the ratio of the input voltage to $R_{46}$, and thus larger values of $R_{46}$ may eliminate a requirement for a rate scaling network 55.

In addition, exceptionally long signal delays may be effected by employing a difference amplifier with very low bias and offset currents (e.g., picoamperes) and a very high input impedance in the many megohm range, as by employing field effect difference determining input transistors rather than junction devices (or by connecting a high impedance biasing network — e.g., a taped potentiometer connected between positive and negative sources — to the inverting amplifier input terminal).

What is claimed is:

1. In combination in a sampled data system, a plurality of signal sources, recorder means for providing a record of the signal outputs from said signal sources measured at discrete time intervals, sampling means having plural inputs and an output for sequentially and repetitively connecting the outputs from said signal sources to the input of said recorder at spaced time intervals, said signal sources being connected to the input of said sampling means and said recorder means connected to the output of said sampling means, at least one signal translating network connecting the output of an associated one of said signal sources and an input of said sampling means, said signal translating network including a difference amplifier including inverting and noninverting input terminals and an output terminal, a shunt-connected capacitor and resistor connected between said amplifier output and inverting input terminals, resistance means connected to said amplifier inverting input terminal for providing a virtual ground at said terminal, and signal coupling means for coupling at least a measure of the output signal from said associated signal source to said difference amplifier and for constraining essentially all of said coupled voltage to appear across said additional resistance means, thereby fixing the current through said capacitor and resistor and the maximum time rate of change of the voltage at said amplifier output terminal.

2. A combination as in claim 1 wherein said signal coupling means includes input scaling means for reducing the output from said signal source.

3. A combination as in claim 2 wherein said signal coupling means is connected to said noninverting amplifier input terminal.

4. A combination as in claim 3 further comprising a voltage offset inhibiting resistor connected to said amplifier noninverting input terminal.

5. A combination as in claim 1 further comprising output scaling means connected to said amplifier output terminal.

6. A combination as in claim 1 wherein said difference amplifier has a maximum slewing rate of S volts per second, where S is a real number much less than 1, and wherein $$e/RC \leq S,$$

where
    $e$ is the maximum applied input signal supplied by said coupling means,
    $R$ is the resistance of said additional resistance means, and
    $C$ is the capacitance of said capacitor.

7. In combination in a sampled data system, a plurality of signal sources, recorder means for providing a record of the signal outputs from said signal sources measured at discrete time intervals, sampling means for sequentially and repetitively connecting the outputs from said signal sources to the input of said recorder at spaced time intervals, at least one signal translating network connecting an associated one of said signal sources and an input of said sampling means, said signal translating network including current source means for supplying an output current which is directly dependent upon the output signal supplied by said associated signal source, said current source means including a difference amplifier including inverting and noninverting input terminals and an output terminal, resistance means connected to said amplifier inverting input terminal for providing a virtual ground at said terminal, and impedance means connected between said amplifier output and inverting input terminals, said impedance means comprising a capacitor and an additional resistance connected in parallel therewith, and signal coupling means for coupling at least a measure of the output signal from said associated signal source to said difference amplifier and for constraining essentially all of said coupled voltage to appear across said resistance means thereby fixing the current through said capacitor and resistor and the maximum time rate of change of the voltage at said amplifier output terminal.

8. A combination as in claim 7, wherein said signal coupling means includes input scaling means for reducing the output from said signal source and for supplying a millivolt range input signal to said difference amplifier.

* * * * *